Figure 1:
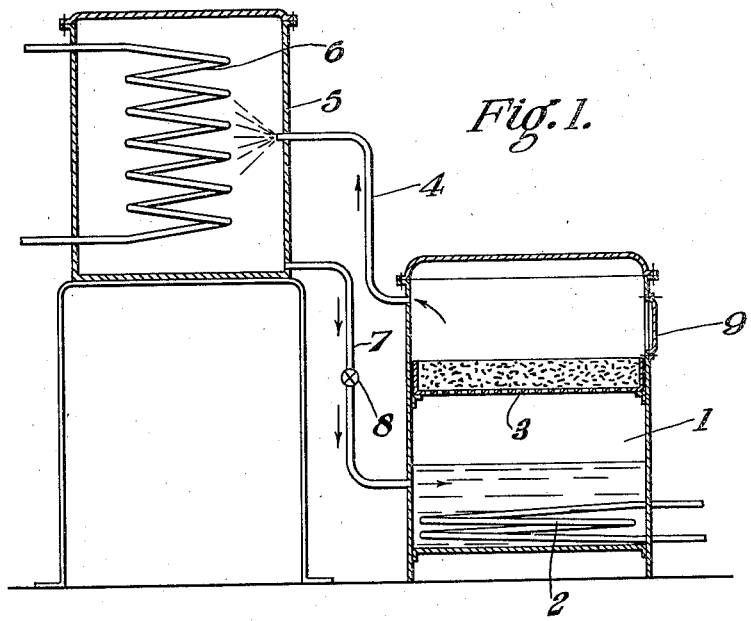

Dec. 21, 1937.  F. N. PICKETT  2,102,741

PROCESS FOR TREATING VULCANIZED RUBBER

Filed April 21, 1934

Inventor
Francis Norman Pickett
By Pennie Davis Marvin & Edmonds
Attorneys

Patented Dec. 21, 1937

2,102,741

UNITED STATES PATENT OFFICE 2,102,741

PROCESS FOR TREATING VULCANIZED RUBBER

Francis Norman Pickett, London, England, assignor to United States Rubber Products, Inc., New York, N. Y., a corporation of Delaware Application April 21, 1934, Serial No. 721,760
In Great Britain July 31, 1933

10 Claims. (Cl. 18—52)

This invention relates to the treatment of vulcanized rubber and has for its general object to provide a commercial and economic process by means of which vulcanized rubber can be de-vulcanized to a condition where, by the addition of ordinary vulcanizing materials such as sulphur and the usual accelerators the material can be re-vulcanized and moulded to any desired form and shape.

More specifically the invention has for its particular object the treatment of old rubber tires and results in the recovery not only of the rubber but of the other constituents contained in such tires particularly the gas carbon black and zinc oxide.

It has been suggested in the past to employ various solvents such for instance as hydrocarbons of the terpene series to devulcanize rubber and it has been suggested to use the oily distillate of the rubber itself for this purpose.

I have found by experiment that while many of these hitherto known solvents prove satisfactory for effecting devulcanization they all suffer from the defect that the devulcanized product is not susceptible of revulcanization by ordinary methods and processes.

The solvent I have found satisfactory for use in my improved process is an oil obtained by rectifying the complex distillate of rubber which may be obtained by heating the rubber—which may be waste rubber—condensing the vapours and rectifying the distillate to remove the isoprene and possibly other volatile fractions.

Rapid distillation of rubber at high temperature produces a substantial proportion of isoprene, the remainder of the distillate being what is known as Heveene. I have found also that there is a cracking effect on the heavier oils, with the result that the distillate contains a proportion of volatile oils, which may assist in de-vulcanization of rubber, but which cause blow holes due to their volatilization in the vulcanizate when the said rubber is re-vulcanized, and therefore when using products of high temperature distillation I remove these volatile oils at some point in my process, usually after de-vulcanization and before re-vulcanization.

I have noticed the same effect with the isoprene content of the distillate and I therefore discard the isoprene in the solvent I use, usually by fractional distillation.

The presence in the distillate of the more volatile oils, and especially of isoprene, adversely affects the stability of the solvent, as is evidenced by rapid discoloration and other changes; but a solvent as used according to the present invention, which is substantially devoid of comparatively volatile components and unsaturated bodies of the character of isoprene, does not undergo such discoloration and appears unimpaired even on exposure to air for a comparatively long period.

With low temperature distillation and slow heating I have found that the isoprene content of the distillate is low, and that substantially no cracking takes place, so that I am able on removal of the isoprene and volatile oils, to obtain a higher proportion of what I believe to be Heveene and heavy oils intimately mixed.

My invention in its broadest aspect may be said to consist of a process for devulcanizing rubber according to which the rubber to be treated is subjected to the action of a solvent obtainable by distilling crude or vulcanized rubber and rectifying the distillate for the removal of the isoprene and other volatilizable fractions.

The de-vulcanization can be effected by heating the rubber in admixture with a solvent consisting as aforesaid of a rectified distillate of the crude or vulcanized rubber.

During the process of distillation of tread rubber from tires gas carbon black and zinc oxide remain as a residue as will hereafter appear and the recovery of these materials as by-products of the process constitutes a further feature of my invention.

Vulcanized rubber forming the tread of a tire is with slight modification by particular manufactures compounded of the following ingredients and proportions. For a total weight of 160 lbs. of vulcanized rubber smoked sheets account for 100 lbs., gas carbon 50 lbs., zinc oxide 5 lbs., and the balance is made up of sulphur, accelerators and perhaps oils.

If this is subjected to low-temperature distillation with careful control of the temperature and pressure in the still, a distillate of light oils is obtained in the condenser until a point is reached when the weight of tire rubber left in the still is approximately half of its original weight.

If this rubber is then withdrawn from the still it will be found to be a compound consisting of rubber 25 lbs., gas carbon 50 lbs., zinc oxide 5 lbs., with a residue of about 3 lbs., presumably consisting of the original vulcanizing materials.

The rubber has been softened but not destroyed and the mixture may be worked in a mill to thoroughly mix the materials, and may then be added to crude rubber in the following proportions.

Smoked sheets 75 lbs., the compound rubber mixture as above 80 lbs., and this gives a mix of rubber 100 lbs., gas carbon 50 lbs., zinc oxide 5 lbs., which is a standard compounding for tread rubber. The residue presumably containing accelerators originally used in the compounding of the rubber under treatment behaves as an accelerator and it is not necessary to add other accelerators to the new mix, but it does require additional sulphur for vulcanization. The rubber in the compound rubber mixture may be reduced to more or less than 25% of its original weight.

I prefer to carry the distillation of the rubber to completion, and I then obtain gas carbon and zinc oxide, in a combined form that can be ground to a very fine powder and compounded with smoked sheets in the ordinary manner. I have found that this material possesses activated properties and gives accelerated vulcanization, as compared with fresh gas carbon and zinc oxide.

For adding gas carbon obtained from waste vulcanized rubber to rubber latex, I make an aqueous dispersion of the still plastic rubber mixture as removed from the still, and this dispersion can be added to rubber latex (preferably stabilized) by simple stirring, without coagulating the latex as gas carbon does if added in powder form. Other fillers may be added to the plastic rubber mixture before the aqueous dispersion is made.

It is important that my solvent should be freed from isoprene and volatile oils, and for that reason the solvent may be prepared in the following manner:

Vulcanized or raw rubber preferably as free from mineral fillers as possible is subjected to heat in a closed vessel sufficient to cause the rubber to soften and melt. Heating is continued at a predetermined temperature preferably not exceeding 400° F. until all the volatile contents of the rubber are driven off and if so desired condensed.

The residue left behind is an oily liquid of complex composition. This oil is probably mainly depolymerized rubber, but acts in the same manner as my solvent prepared by rectification of rubber distillate.

After "straining" to free it from solid matter this oil may be used as a solvent, and it is to be understood that wherever I use the term "rectified distillate of rubber" in this specification I intend to include this oil as well as the distillate of rubber rectified at lower temperatures mainly for the purpose of removing the isoprene.

An important feature of my invention is the method of application of my solvent to the de-vulcanization of rubber.

Rubber compounding prior to vulcanization is an exact science, and it is insufficient to say merely that waste rubber heated with my solvent is de-vulcanized and may be re-vulcanized. I have invented various new materials incorporating waste rubber and my solvent that are in themselves novel, and the process may be so adjusted that a compound plastic rubber may be manufactured from waste rubber, having known characteristics and which may be used for specific purposes. The process can be adjusted in advance to obtain plastic compounded rubber having the desired characteristics.

As an example I can prepare a rubber specially adapted for the manufacture of hard rubber or as it is sometimes known ebonite.

The modern method of manufacturing ebonite is to masticate raw rubber and then compound with it fillers, usually ebonite dust, since this already possesses the same ingredients as the finished compound will have, but such fillers as china clay are also used.

Sulphur in excess of 30% of the rubber employed is then compounded with it, and also accelerators if desired, and this compounded rubber is then vulcanized in a known manner to produce hard rubber.

The amount of fillers that can be added to the raw rubber is limited in the first place, by the capacity of the raw rubber to absorb fillers without breaking up during the milling i. e. losing its plasticity, and in the second place by the physical characteristics required in the finished product. It has been found in practice that 50 per cent of fillers by weight of the raw rubber is about the limit that can be satisfactorily employed. In the case of commercial acid or alkali reclaimed rubber this limit is about 10 per cent.

According to my invention, by adjusting the amount of solvent used, it is possible to manufacture a rubber from waste tires that will absorb more than 70 per cent of its own weight of new fillers and yet produce a satisfactory hard rubber on vulcanization.

This is accomplished by adding an excess of solvent over and above that required to merely devulcanize the waste rubber or to render it plastic, and retaining the solvent in the rubber.

In the example given above for hard rubber it has been found that although 2½ per cent of solvent by weight on the waste rubber will render it plastic, the percentage of solvent is increased to 60 per cent by weight on the waste rubber, and the resulting plastic rubber may be used alone without the addition of crude rubber to absorb the fillers and produce a compound for hard rubber.

To merely devulcanize the rubber and render it plastic 2½ per cent of solvent on the weight of waste rubber (say tire treads) is sufficient.

To produce a general purpose devulcanized plastic rubber suitable for use where "reclaim" is used to-day, 10% by weight of solvent is used. A softer general purpose "reclaim" is obtained by using 20% by weight of solvent and the resulting vulcanizate on revulcanizing is soft, and has good ageing qualities and excellent appearance and properties.

All devulcanized plastic rubber produced by my process possesses the properties of being re-vulcanized alone or mixed with crude rubber, additional sulphur only being necessary. I make no attempt to polymerize my solvent either before or after its incorporation in the rubber although it may be polymerized if desired with the aid of hydrochloric acid. It is a part of my invention of these rubbers that I retain the solvent in the rubber.

The application of the solvent to the waste rubber may be made in a variety of ways, some of which are as follows:—

To produce a solution I place finely comminuted waste vulcanized rubber in a closed vessel fitted with a reflux condenser and add four to five times its weight of solvent, the solvent having been previously heated to 300° F. to free it from isoprene and light volatiles. The vessel is then heated to a temperature sufficient to boil the solvent, preferably not exceeding 400° F. and heating is maintained until all the rubber is dissolved.

If the contents of the vessel are agitated the fillers such as carbon black in tire rubber will remain suspended in the solution, failing this the insoluble fillers separate out and fall to the bottom of the vessel where they may be collected on cooling or taken off through sludge traps. These fillers may be dried and ground and used again for compounding.

When the waste rubber is dissolved the solution may be withdrawn including the solvent and used in this form as an adhesive or as a devulcanizer, or the solution may be coagulated by means of alcohol or acetic acid, or an aqueous dispersion may be made of it in known manner.

Another method of using the solvent is in its gaseous state. In this method I place finely comminuted vulcanized rubber on a perforated tray in a closed vessel. At the bottom of the vessel I place a quantity of my solvent, so arranged that the rubber is not in contact with the solvent. The vessel is fitted with a reflux condenser.

On heating the solvent to boiling point the vapours that are given off pass over and through this comminuted rubber which becomes devulcanized and plastic after a time and may be then removed and sheeted on a mill.

The solvent vapours are condensed in the reflux condenser and returned to the vessel.

A variation of the process is to allow the condensed solvent to come into contact with the rubber as it flows from the reflux condenser. Another variation is to arrange the vessel and reflux condenser as a Soxhlet apparatus.

I provide suitable examination doors in the sides of the vessel through which it is possible to examine the rubber for plasticity during the operation.

To manufacture devulcanized rubber to a pre-determined plasticity and solvent content I use the following method:

Solvent is added to a given weight of finely comminuted vulcanized rubber in a desired predetermined proportion and thoroughly mixed. This mixture is then placed in a pressure vessel and subjected to a steam pressure preferably not exceeding 60 lbs. to the square inch. It is advisable to have the exhaust valve "cracked" or slightly open during the operation so that any volatile gases given off are carried away by the steam. The length of time to which the mixture is subjected to steam and the pressure of the steam is pre-determined after experiment, and on completion of the operation, the previously vulcanized rubber is found to be in the exact state of de-vulcanization or plasticity required. It may be removed from the pressure vessel and worked and sheeted on a mill ready for use.

It will be obvious that rubber in any state of plasticity or devulcanization may be obtained by this means down to its extreme limit of liquidity.

Another method of devulcanization is to work an admixture of vulcanized rubber and solvent from which isoprene and volatile oils have been removed, on an ordinary mixing mill, with or without steam heat on the rolls. Mixing is continued until the rubber becomes sufficiently plastic.

My solvent is also a solvent for crude rubber, so that this may be softened to any extent or dissolved by any of the methods described, the solvent being retained in the rubber.

It is not essential to have the vulcanized rubber it is desired to treat in a comminuted state, but it is preferable.

Any of the before mentioned processes may be used to soften or dissolve rubber extracted from waste tires, such as is obtained in the well known acid or alkali methods of vulcanizing rubber. In the latter process, my solvent can be added in pre-determined proportion, to the rubber, whilst it is in the digester.

A solvent consisting of a rectified distillate of rubber, in accordance with my invention, would be the ideal softener for adding to alkali or acid reclaims, at any stage, after the cotton has been destroyed, and would make a very effective softener and de-vulcanizer.

The accompanying drawing illustrates diagrammatically forms of apparatus suitable for carrying out the devulcanizing process with solvents according to my invention.

Figure 2:
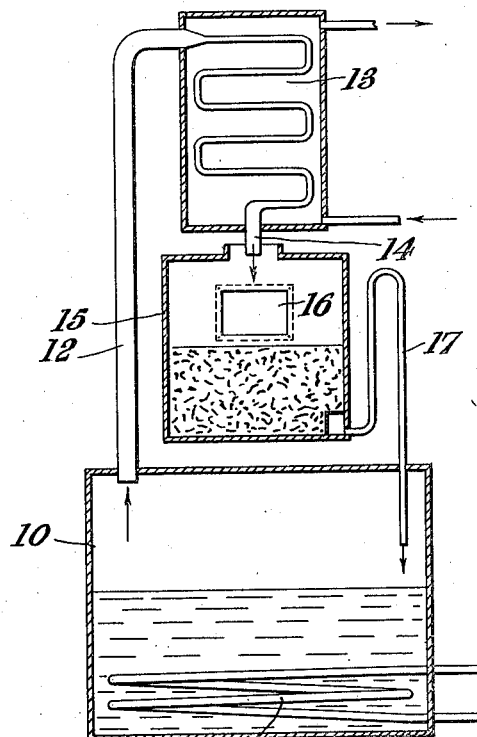

Fig. 1 illustrates in diagrammatic elevation an apparatus for effecting gaseous treatment and Fig. 2 illustrates in diagrammatic elevation a Soxhlet apparatus.

Referring particularly to Fig. 1 solvent contained in the tank 1 is heated by means of the steam heating coil 2 and the vapour rises and passes into contact with the rubber to be treated—which is preferably in crumbed condition—supported upon a gauze tray 3. The excess vapour passes through the pipe 4 into the condenser 5, provided with a water cooled coil 6, where it is condensed and runs by gravity through the pipe 7 fitted with a non-return valve 8 back to the solvent tank 1 where the action may be repeated until the batch of rubber on the supporting tray 3 has been completely de-vulcanized. The treated rubber is then removed and the apparatus recharged with fresh supplies of rubber to be treated and solvent. An inspection door 9 is provided so that progress can be observed.

In the Soxhlet apparatus illustrated in Fig. 2 the solvent contained in the tank 10 is heated by the steam heating coils 11 and passes by way of the pipe 12 through the water cooled condenser 13 and the condensate from this condenser passes from the pipe 14 into the container 15 which is charged with the rubber to be treated and the heated solvent, acting on the rubber devulcanizes it. Here again an inspection door 16 is provided to enable the progress of the operation to be observed. When the container 15 is full the solvent is syphoned off by way of the syphon pipe 17 back to the solvent tank 10.

It will be observed that the operation is continuous in both cases until the desired condition of the rubber being treated is reached.

It is to be observed that an important factor in my process resides in the fact that the special solvent I employ is itself vulcanizable and having obtained the solvent by distillation and rectification it is only necessary to add sulphur and fillers in the required proportions to produce a rubber compound by any known processes of vulcanization.

What I claim and desire to secure by Letters Patent is:—

1. A process for manufacturing commercial hard rubber from vulcanized rubber which has been de-vulcanized by means of a rectified distillate of rubber comprising Heveene and similar high boiling point oils but substantially free of the isoprene fraction and resulting from heating rubber at a temperature not exceeding 400° F., characterized in that an excess of the distillate is incorporated in and retained in the rubber and a proportionately increased quantity of filler material is added together with vulcanizing ingredients, prior to vulcanization to the desired hard rubber.

2. A process of treating vulcanized rubber waste which comprises adding to the vulcanized rubber waste in a comminuted state in a pressure vessel a distillate of rubber comprising Heveene and similar high boiling point oils from which distillate isoprene and other fractions which boil off below 300° F. have been removed and subjecting the mix to heat up to and not in excess of that corresponding to substantially 60 lbs. per square inch steam pressure and for a time sufficient to ensure devulcanization.

3. A process of manufacture of rubber which comprises plasticizing comminuted vulcanized rubber by the intimate incorporation therewith of a distillate of rubber comprising Heveene and similar high boiling point oils from which distillate the isoprene fraction has been substantially removed, the process being carried out at a temperature and for a period of time sufficient to ensure devulcanization.

4. A process of manufacture of rubber which comprises plasticizing comminuted vulcanized rubber from vulcanized rubber waste with at least 2½ percent by weight based on the rubber of a distillate comprising Heveene and similar high boiling point oils from which distillate the isoprene fraction has been substantially removed, the process being carried out at a temperature and for a period of time sufficient to ensure devulcanization.

5. A process of manufacture of rubber which comprises plasticizing comminuted vulcanized rubber from vulcanized rubber waste with from substantially 10 to 20 percent by weight based on the rubber of a distillate comprising Heveene and similar high boiling point oils from which distillate the isoprene fraction has been substantially removed, the process being carried out at a temperature and for a period of time sufficient to ensure devulcanization.

6. A process of manufacture of rubber which comprises plasticizing comminuted vulcanized rubber from vulcanized rubber waste by heating the rubber under pressure not exceeding 60 lbs./sq. in. with a distillate of rubber comprising Heveene and similar high boiling point oils from which distillate the isoprene fraction has been substantially removed, the process being carried out at a temperature and for a period of time sufficient to ensure devulcanization.

7. The process for devulcanizing rubber according to claim 3 in which the rubber to be devulcanized is subjected to the action of the distillate of rubber in gaseous phase.

8. The process for devulcanizing rubber according to claim 3 in which rubber is heated to a temperature sufficient to ensure volatilization and vaporization above that at which the isoprene fraction condenses and the vapours are brought into intimate contact with the rubber to be treated.

9. The process for treating rubber according to which rubber distillate heated to a temperature in the region of 300° F. to free it from isoprene and other volatiles is brought into contact with comminuted or crumb rubber and the mixture is thereafter maintained at a temperature in the region of but not exceeding 400° F. until all the rubber is dissolved.

10. A process of treating rubber during devulcanization by the known alkali process according to which a solvent consisting of the rectified distillate of rubber comprising Heveene and similar high boiling point oils but substantially free of the isoprene fraction is added to the mixture in the digester of the alkali apparatus.

FRANCIS NORMAN PICKETT.